(12) United States Patent
Duesing et al.

(10) Patent No.: US 10,151,487 B2
(45) Date of Patent: Dec. 11, 2018

(54) SEQUENTIAL COMBUSTION ARRANGEMENT WITH DILUTION GAS

(71) Applicant: ANSALDO ENERGIA SWITZERLAND AG, Baden (CH)

(72) Inventors: Michael Duesing, Rheinfelden (DE); Ewald Freitag, Baden (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 436 days.

(21) Appl. No.: 14/593,032

(22) Filed: Jan. 9, 2015

(65) Prior Publication Data

US 2015/0198334 A1 Jul. 16, 2015

(30) Foreign Application Priority Data

Jan. 10, 2014 (EP) .................................... 14150737

(51) Int. Cl.
*F23R 3/34* (2006.01)
*F02C 3/30* (2006.01)
(Continued)

(52) U.S. Cl.
CPC ................ *F23R 3/346* (2013.01); *F02C 3/30* (2013.01); *F23C 6/04* (2013.01); *F23R 3/04* (2013.01);
(Continued)

(58) Field of Classification Search
CPC .. F23R 3/346; F23R 2900/03341; F23R 3/34; F23R 3/04; F02C 3/20; F02C 3/30;
(Continued)

(56) References Cited

U.S. PATENT DOCUMENTS 5,349,812 A 9/1994 Taniguchi et al.
5,593,302 A * 1/1997 Althaus ................... F23M 9/00
431/350

(Continued)

FOREIGN PATENT DOCUMENTS

CN 102099628 A 6/2011
CN 103443542 A 12/2013
(Continued)

OTHER PUBLICATIONS

Arthur Henry Lefebvre et al., "Gas Turbine Combustion: Alternative Fuels and Emissions, Third Edition", Apr. 26, 2010, CRC Press, XP002725142, pp. 114-117.*
(Continued)

*Primary Examiner* — Gerald Luther Sung
*Assistant Examiner* — Alain Chau
(74) *Attorney, Agent, or Firm* — Buchanan Ingersoll & Rooney PC

(57) ABSTRACT

The invention refers to a sequential combustor arrangement including a first combustor with a first burner for admitting a first fuel into a combustor inlet gas during operation and a first combustion chamber for burning the first fuel, a dilution gas admixer for admixing a dilution gas to the first combustor combustion products leaving the first combustion chamber, and a second burner for admixing a second fuel and a second combustion chamber. To assure good mixing over a wide operating range, the ratio of the pressure loss of the first combustor to the pressure loss of the dilution gas admixer is in the range of 1 to 6. The invention further refers to a gas turbine including such a sequential combustor arrangement as well as method for operating a gas turbine with such a sequential combustor arrangement.

18 Claims, 2 Drawing Sheets

(51) Int. Cl.
*F23R 3/04* (2006.01)
*F23C 6/04* (2006.01)

(52) U.S. Cl.
CPC ............ *F23R 3/34* (2013.01); *F05D 2220/32* (2013.01); *F05D 2240/35* (2013.01); *F23C 2201/20* (2013.01); *F23R 2900/03341* (2013.01)

(58) Field of Classification Search
CPC ........ F23C 6/04; F23C 6/042; F23C 2201/00; F23C 2201/20; F23C 2201/30; F23C 2201/301; F23C 2201/40; F23C 2201/401; F23C 6/045; F23C 6/047; F23N 2027/10
See application file for complete search history.

(56) References Cited

U.S. PATENT DOCUMENTS

| | | | | |
|---|---|---|---|---|
| 5,609,030 A | * | 3/1997 | Althaus | F23D 23/00 |
| | | | | 60/737 |
| 5,626,017 A | * | 5/1997 | Sattelmayer | F23C 6/042 |
| | | | | 60/723 |
| 6,935,116 B2 | | 8/2005 | Stuttaford et al. | |
| 7,237,384 B2 | | 7/2007 | Stuttaford et al. | |
| 8,677,756 B2 | * | 3/2014 | Poyyapakkam | F23C 5/08 |
| | | | | 239/403 |
| 2004/0228723 A1 | * | 11/2004 | Dittmann | F01D 25/12 |
| | | | | 415/117 |
| 2011/0030375 A1 | * | 2/2011 | Bunker | F23D 14/64 |
| | | | | 60/742 |
| 2014/0033728 A1 | * | 2/2014 | Marmilic | F02C 7/141 |
| | | | | 60/772 |

FOREIGN PATENT DOCUMENTS

| | | | |
|---|---|---|---|
| DE | 103 12 971 A1 | 12/2004 | |
| DE | 10312971 A1 * | 12/2004 | F02C 3/305 |
| EP | 0 321 809 A1 | 6/1989 | |
| EP | 0 780 629 A2 | 6/1997 | |
| EP | 2 722 591 A1 | 4/2014 | |
| EP | 2 725 300 A1 | 4/2014 | |
| GB | 2 079 926 A | 1/1982 | |
| WO | 2012/136787 A1 | 10/2012 | |
| WO | 2014/001230 A1 | 1/2014 | |

OTHER PUBLICATIONS

I T Von et al."Konstruktion eines Brennkammer-Prüfstandes and Messungen unter mittlerem Druck", Mar. 31, 2007, XP055120623, pp. 1-154.
GCC Patent Office Examination Report dated Dec. 21, 2017, of the corresponding GCC Patent Application No. GC 2015-28749 (4 pages).
Search Report for Chinese Patent Application Serial No. 201510010565.2 dated Jun. 4, 2018.
Chinese Office action for Chinese Patent Application Serial No. 201510010565.2 dated Jun. 20, 2018.
English Translation of Chinese Office action for Chinese Patent Application Serial No. 201510010565.2 dated Jun. 20, 2018.

* cited by examiner

SEQUENTIAL COMBUSTION ARRANGEMENT WITH DILUTION GAS

CROSS-REFERENCE TO RELATED APPLICATIONS

This application claims priority to European application 14150737.6 filed Jan. 10, 2014, the contents of which are hereby incorporated in its entirety.

TECHNICAL FIELD

The invention refers to a sequential combustor arrangement for a gas turbine with admixing dilution gas into the sequential combustor arrangement. The invention additionally refers to a method for operating a gas turbine with admixing dilution gas into a sequential combustor arrangement.

BACKGROUND

Due to increased power generation by unsteady renewable sources like wind or solar existing gas turbine based power plants are increasingly used to balance power demand and to stabilize the grid. Thus improved operational flexibility is required. This implies that gas turbines are often operated at lower load than the base load design point, i.e. at lower combustor inlet and firing temperatures.

At the same time, emission limit values and overall emission permits are becoming more stringent, so that it is required to operate at lower emission values, keep low emissions also at part load operation and during transients, as these also count for cumulative emission limits.

State-of-the-art combustion systems are designed to cope with a certain variability in operating conditions, e.g. by adjusting the compressor inlet mass flow or controlling the fuel split among different burners, fuel stages or combustors. However, this is not sufficient to meet the new requirements.

To further reduce emissions and to increase operational flexibility sequential combustion has been suggested in DE 10312971 A1. Depending on the operating conditions, in particular on the hot gas temperature of a first combustion chamber, it can be necessary to cool the hot gases before they are admitted to a second burner (also called sequential burner). This cooling can be advantageous to allow fuel injection and premixing of the injected fuel with the hot flue gases of the first combustor in the second burner.

Good control of the inlet temperature to the second combustion chamber and good mixing of fuel injected in the second burner with the gases leaving the first combustor is a prerequisite for stable combustion with low emission values.

SUMMARY

The object of the present disclosure is to propose a sequential combustor arrangement comprising means for admixing dilution gas and the second fuel between the first combustion chamber and the second combustion chamber. Such a "dilution burner" has to provide the proper inlet flow conditions for the second combustion chamber for a wide operating range of the gas turbine. Basically, predefined inlet conditions have to be assured for all operating conditions in which the second combustor is operating. In particular the hot gases are cooled to predetermined hot gas temperatures. Further, velocity distribution, oxygen and fuel content can be conditioned (e.g. controlled to a prescribed profile) for the second combustion chamber with proper admixing of dilution gas.

Deviations from prescribed inlet temperatures may result in high emissions (e.g. NOx, CO, and unburned hydrocarbons) and/or flashback in the dilution burner. Flashback and NOx are induced by the reduced self-ignition time for the injected fuel due to a high inlet gas temperature or high oxygen concentration, which causes earlier ignition (leading to flashback) or reduced time for fuel air mixing resulting in local hot spots during combustion and consequently increased NOx emission. Low temperature regions can cause CO emissions, due to the increased self-ignition time. This can reduce the time for CO to CO2 burnout, and a reduced local flame temperature, which can further slow-down the CO to CO2 burnout. Finally local hot spots may lead to overheating in certain regions downstream of the mixer.

Dilution gas can for example be compressed air or a mixture of air and flue gases of a gas turbine. Also compressed flue gases can be used as dilution gas.

According to a first embodiment of a sequential combustor arrangement the sequential combustor arrangement comprising a first combustor with a first burner for admitting a first fuel into a combustor inlet gas during operation, and a first combustion chamber for burning the first fuel with the combustor inlet gas. Typically the combustor inlet gas is compressed air. Depending on the application it can be another gas or gas mixture such as for example a mixture of air and a flue gas. The sequential combustor arrangement further comprises a dilution gas admixer for admixing a dilution gas to the first combustor combustion products leaving the first combustion chamber, and a second burner for admixing a second fuel and a second combustion chamber. The second fuel can be burned in with the mixture of first combustion products and dilution air in the second combustion chamber. The first combustor, the dilution gas admixer, the second burner and second combustion chamber are arranged sequentially in a fluid flow connection. To assure a good mixing of dilution air to the first combustor combustion products the ratio of the pressure loss of the first combustor to the pressure loss of the hot gas in the dilution gas admixer is in the range of 2 to 12. The ratio in pressure losses can be realized by designing the first combustor with a pressure loss coefficient of the combustor and the mixer with a pressure loss coefficient of the mixer. As reference cross section for the pressure loss coefficient of the first combustor and of the mixer, the cross sections at the exit of the first combustion chamber can be used. Designing the first combustor and the dilution gas admixer with pressure loss ratio in the range of 2 to 12 allows the operation of the mixer at an almost constant momentum flux ratio between the hot combustion products and the dilution gas flows. Thus the inlet temperature profile at the sequential burner inlet plane basically remains almost the same for different operating conditions.

The pressure loss of the combustor can be determined to a large degree by the type of burner used and the required hot gas temperature. A small additional pressure loss due to the admixer reduces the overall pressure loss of the of the sequential combustor arrangement. However, a small pressure loss in the admixer increases the ratio of the pressure loss coefficient of the first combustor to the dilution gas admixer. If the ratio of the pressure loss of the first combustor to the dilution gas admixer gets too large, e.g. above 12 the mixing quality can change due to changes in the operating conditions of the first and second combustion chamber, and can in particular have adverse effect on the combustion in the second combustion chamber. This can lead to high emissions or combustion instabilities such as pulsation.

An increase in the pressure loss of the admixer provides stable boundary conditions for admixing the dilution gas. However, a large pressure loss in the admixer increases the total pressure loss of the sequential combustor arrangement. Such a large pressure loss can have a noticeable negative impact on the overall power and efficiency if applied in gas turbine. Therefore the ratio of the pressure loss of the first combustor to the pressure loss of the dilution gas admixer should be kept above 2. Accordingly the ratio of the pressure loss coefficient of the first combustor to pressure loss coefficient of the dilution gas admixer should be kept above 2.

According to a further embodiment of the sequential combustor arrangement the ratio of the pressure loss of the first combustor to the pressure loss of the dilution gas admixer is in the range of 3 to 10.

Correspondingly, the ratio of the pressure loss coefficient of the first combustor to the pressure loss coefficient of the dilution gas admixer is in the range of 3 to 10.

According to yet a further embodiment of the sequential combustor arrangement the ratio of the pressure loss of the first combustor to the pressure loss of the dilution gas admixer is in the range of 5 to 8.

Correspondingly, the ratio of the pressure loss coefficient of the first combustor to the pressure loss coefficient of the dilution gas admixer is in the range of 5 to 8.

The admixer of the sequential combustor arrangement can have openings or nozzles arranged on the side wall for injecting the dilution air into the first combustor combustion products. The dilution gas admixer can also comprises at least one streamlined body which is arranged in the dilution gas admixer for introducing the dilution gas into the first combustion products leaving the first combustion chamber during operation. Dilution gas can be admitted into the first combustor combustion products through at least one nozzle arranged on a wall of the streamlined body. The streamlined body can for example be a profile with a nozzle on one surface or a trailing edge. It can be simple pipe extending into the flow of first combustor combustion products with an open end for admixing the dilution gas. The admixer can also comprise a combination of wall nozzles and at least one streamlined body for dilution gas admittance.

According to an embodiment of the sequential combustor arrangement it comprises a feeder for dilution gas. This feeder connects the dilution gas admixer to a compressor plenum from where the dilution gas is feed to the admixer. According to a further embodiment of the sequential combustor arrangement a dilution gas control valve is arranged in the dilution gas feeder. Such a control valve can increase the operational flexibility of the sequential combustor arrangement by controlling the inlet conditions for the second combustion chamber.

Besides the sequential combustor arrangement a gas turbine with such a sequential combustor arrangement and a method for operating a gas turbine with such a sequential combustor arrangement are the subject of the present disclosure.

Such a gas turbine comprises a compressor, a turbine and a sequential combustor arrangement interposed between the compressor and the turbine. The sequential combustor arrangement has a first combustor comprising a first burner for admitting a first fuel into a combustor inlet gas during operation and a first combustion chamber for burning the first fuel, a dilution gas admixer for admixing a dilution gas to the first combustor combustion products leaving the first combustion chamber during operation, a second burner, and a second combustion chamber. The first combustor, the dilution gas admixer, the second burner, and second combustion chamber are arranged sequentially in a fluid flow connection. The ratio of the pressure loss of the first combustor to the dilution gas admixer is in the range of 1 to 6 in such a sequential combustor arrangement.

Further embodiments of the gas turbine comprise a sequential combustor arrangement as described in the preceding embodiments of the sequential combustor arrangement.

A method for operating such a gas turbine comprises the following steps:
compressing the inlet gas in the compressor,
admixing a first fuel to at least a portion of the compressed gas in the first burner,
burning the mixture in the first combustion chamber to obtain first combustor combustion products.

After these conventional steps the first combustion products are admitted to the dilution gas admixer with a second momentum flux. To cool the first combustor combustion products a dilution gas flow is admitted into the first combustor combustion products flowing through the admixer with a first momentum flux. To obtain a defined temperature profile of the mixed gases at the exit of the admixer the momentum flux of the dilution gas is maintained at a level such that the ratio of the first momentum flux to the second momentum flux is kept in a defined interval relative to a design ratio of first momentum flux to second momentum flux.

According to one embodiment of the method the defined interval relative to a design ratio of first momentum flux to second momentum flux is the design ratio +/−20% of the design ratio of first momentum flux to second momentum flux. In a particular embodiment the interval is limited to the design ratio +/−10% of the design ratio of first momentum flux to second momentum flux.

The design ratio can be defined for base load (i.e. full load) operation of the gas turbine. Typically ambient conditions, such as for example ISO conditions (15° C., 1013 mbar, 60% relative humidity) are also defined for the design conditions. Alternatively the design ratio can also be defined for a part load operating point, e.g. for 80% or 90% relative load (load normalized by the base load)

According to a further embodiment of the method the ratio of the first momentum flux to the second momentum flux is kept in a defined interval from the design ratio during operation in a load range between 50% and 100% relative load of the gas turbine.

According to a further embodiment of the method the ratio of the first momentum flux to the second momentum flux is kept in a defined interval from the design ratio during operation in a load range between 20% and 100% relative load of the gas turbine.

Further, the ratio of the first momentum flux to the second momentum flux can even be kept in a defined interval from the design ratio during operation in a load range between 10% and 100% relative load.

At low part load in the range of 10% to 30% relative load or latest at high relative load, for example above 50% relative load the first and second combustor are both operating i.e. a first fuel is introduced into the first burner and burned in the first combustion chamber and a second fuel is introduced into the second burner and burned in the second combustion chamber. As long as the second burner is in operation it is important to provide good inlet conditions to the second combustion. This is realized by admixing dilution gas with the correct momentum flux relative to the momentum flux of the hot gas from the first combustion chamber, i.e. the correct ratio of momentum fluxes.

According to an embodiment only the first combustor is operating at low load operation, i.e. only a first fuel is introduced into the first burner and burned in the first combustion chamber and no second fuel is introduced. This can be for example at a load below 30% or for example below 10% relative load of the gas turbine.

In yet a further embodiment of the method the ratio of the first momentum flux to the second momentum flux is increased relative to the ratio at design conditions of the gas turbine at a load below for example 10% or for example below 30% relative load of the gas turbine. The increase in ratio of momentum fluxes corresponds to a relative increase in dilution gas flow. This increase can reduce the mass flow through the first combustor and can lead to deviations from the design outlet conditions of the mixer. At low load a decrease in first combustor mass flow can be favorable to allow stable combustion at a reduced fuel flow in the first combustor. In particular if the second combustor is not operating at low load conditions a distorted mixer outlet profile can be tolerated.

The dilution gas admixer can also be combined with dampers or as connecters to damping volumes as described in the European patent application EP12189685, which is incooperated by reference.

The gas turbine can include a flue gas recirculation system, in which a part of the flue gas leaving the turbine is admixed to the compressor inlet gas of the gas turbine.

The dilution gas can be feed to the dilution gas admixer directly from a compressor plenum. It can also be used to cool the first or second combustion chamber walls or liners as well as the walls of the dilution gas admixer before being admixed.

The ratio of the first momentum flux to the second momentum flux can be adjusted to the design value with a dilution air control valve interposed in a supply line to the dilution gas admixer. Such a dilution gas control valve can also be used to control the ratio of the first momentum flux to the second momentum flux as a function of an operating parameter of the gas turbine such as for example the relative load or a hot gas temperature of the second combustor or the hot gas temperature of the first combustor, or a combination of those parameters.

Different cooling technologies might be used for cooling the combustor liners and admixer wall. For example effusion cooling, impingement cooling or convective cooling or a combination of cooling methods can be used.

Referring to a sequential combustion the combination of combustors can be disposed as follows:
Both, the first and second combustors are configured as sequential can-can architecture.
The first combustor is configured as an annular combustion chamber and the second combustor is configured as a can configuration.
The first combustor is configured as a can-architecture and the second combustor is configured as an annular combustion chamber.
Both, the first and second combustor are configured as annular combustion chambers.

Different burner types can be used. For the first combustor so called EV burner as known for example from the EP 0 321 809 or AEV burners as known for example from the DE195 47 913 can for example be used. Also a BEV burner comprising a swirl chamber as described in the European Patent application EP12189388.7, which is incorporated by reference, can be used. In a can architecture a single or a multiple burner arrangement per can combustor can be used. Further, a flamesheet combustor as described in U.S. Pat. Nos. 6,935,116 B2 or 7,237,384 B2, which are incorporated by reference, can be used as first combustor.

BRIEF DESCRIPTION OF THE DRAWINGS

The disclosure, its nature as well as its advantages, shall be described in more detail below with the aid of the accompanying schematic drawings.
Referring to the drawings.

DETAILED DESCRIPTION

Figure 1:
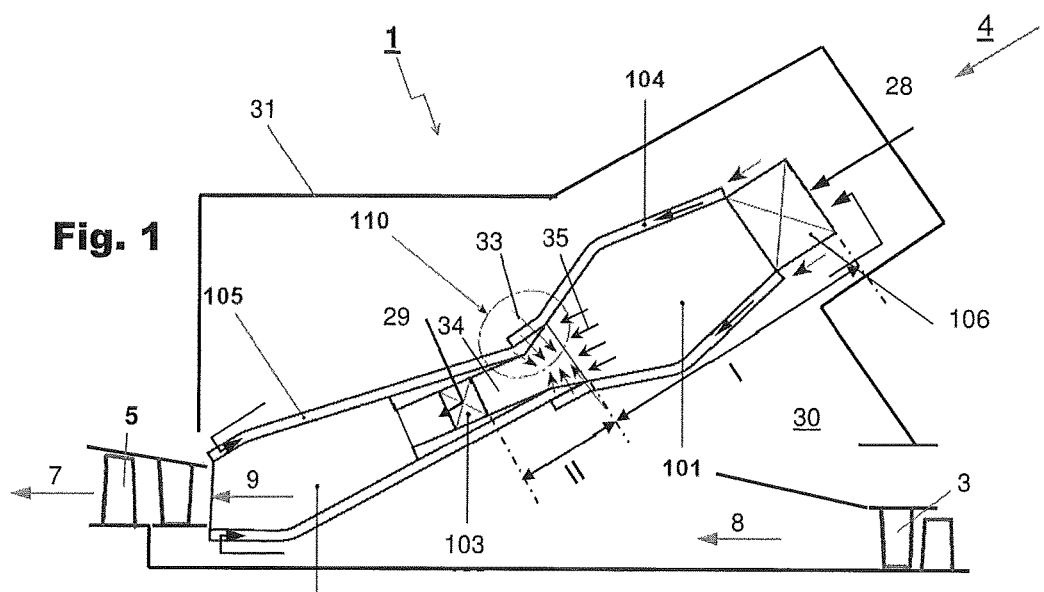
FIG. 1 shows a gas turbine with a sequential combustion arrangement with a first burner, first combustion chamber, an admixer for admixing dilution gas, a second burner, and a second combustion chamber.

FIG. 1 shows a gas turbine 1 with a sequential combustor arrangement 4. It comprises a compressor 3, a sequential combustor arrangement 4, and a turbine 5.

The sequential combustor arrangement 4 comprises a first burner 106, a first combustion chamber 101, and an admixer II for admixing a dilution gas 33 to the hot gases leaving the first combustion chamber 101 during operation. Downstream of the admixer II the sequential combustor arrangement 4 further comprises a second burner 103, and a second combustion chamber 102. The first burner 106, first combustion chamber 101, admixer II, second burner 103 and second combustion chamber 102 are arranged sequentially in a fluid flow connection. The sequential combustor arrangement 4 is housed in a combustor casing 31. The compressed gas 8 leaving the compressor 3 passes through a diffusor for at least partly recovering the dynamic pressure of the gas leaving the compressor 3.

During operation dilution gas is injected into the dilution gas admixer in the dilution gas injection 110. Part of the injected dilution gas 33 has been used to cool the wall of the first combustion chamber 101 before it reaches the dilution gas injection 110. Part of the injected dilution gas 33 has been used to cool the wall of the second combustion chamber 102 and the second burner 103 before it reaches the dilution gas injection 110. Another part of the injected dilution gas 33 is taken from the compressor plenum 30 and directly injected into the admixer II.

To assure good inlet conditions for the second burner 103, e.g. a homogeneous temperature profile or a homogeneous velocity profile the pressure loss of the first combustor (I) to the pressure loss of the dilution gas admixer (II) is in the range of 2 to 12.

The sequential combustor arrangement 4 further comprises a first combustor liner 104 for guiding cooling gas along the walls of the first combustion chamber, and a second combustor liner 105 for guiding cooling gas along the walls of the second combustion chamber 102.

A first fuel 28 can be introduced into the first burner 106 via a first fuel injection, mixed with compressed gas 8 which is compressed in the compressor 3, and burned in the first combustion chamber 101. Dilution gas 33 is admixed in the subsequent admixer II. A second fuel 29 can be introduced into the second burner 103 via a second fuel injector, mixed with hot gas leaving the admixer II and burned in the second combustion chamber 102. The hot gas leaving the second combustion chamber 102 is expanded in the subsequent turbine 5, performing work. The turbine 5 and compressor 3 are arranged on a shaft 2.

The remaining heat of the exhaust gas 7 leaving the turbine 5 can be further used in a heat recovery steam generator or boiler (not shown) for steam generation.

In the example shown here compressed gas 8 is admixed as dilution gas 33. Typically compressed gas 8 is compressed ambient air. For gas turbines with flue gas recirculation (not shown) the compressor gas is a mixture of ambient air and recirculated flue gas.

Typically, the gas turbine system includes a generator (not shown) which is coupled to a shaft 2 of the gas turbine 1. The gas turbine 1 further comprises a cooling system for the turbine 5, which is also not shown as it is not subject of the invention.

Figure 2:
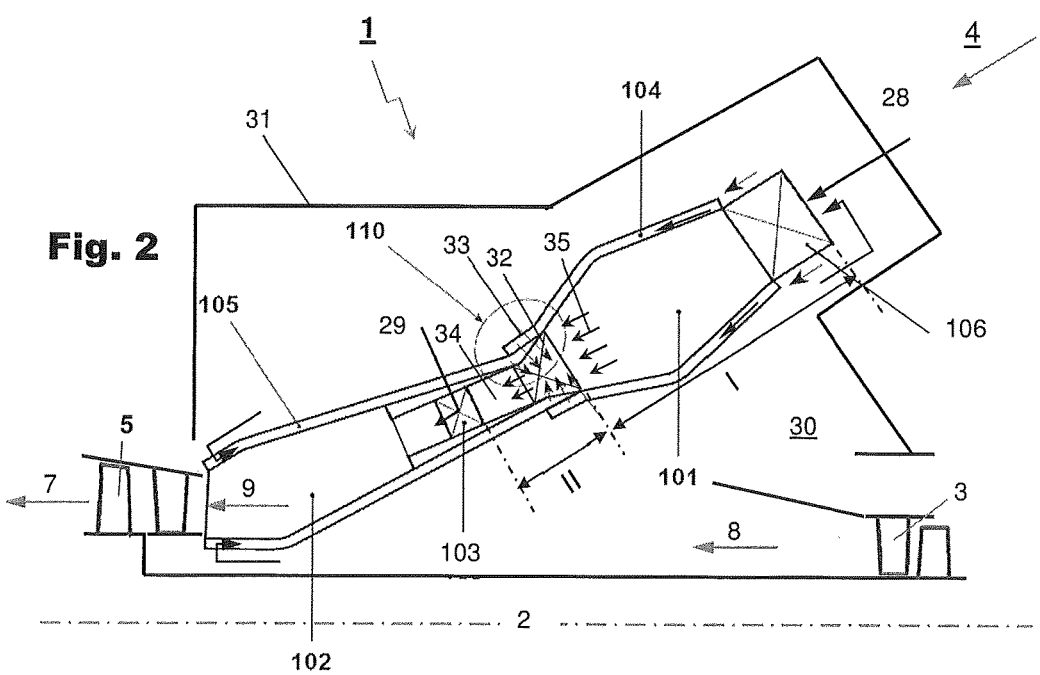
FIG. 2 shows a gas turbine with a sequential combustion arrangement with a first burner, first combustion chamber, an admixer comprising a streamlined body for admixing dilution gas, a second burner, and a second combustion chamber.

The embodiment of FIG. 2 differs from the combustor arrangement of FIG. 1 in that the admixer II comprises a streamlined body 32 for injecting dilution gas 33 into the first combustor combustion products. At least part of the dilution gas 33 is first introduced into the streamlined body 32 and injected into the admixer II from the streamlined body 32. In the example shown the streamlined body 32 is arranged right at the entrance into the admixer II. Embodiments in which the streamlined body is arranged further downstream in the admixer II are also conceivable.

Figure 3:
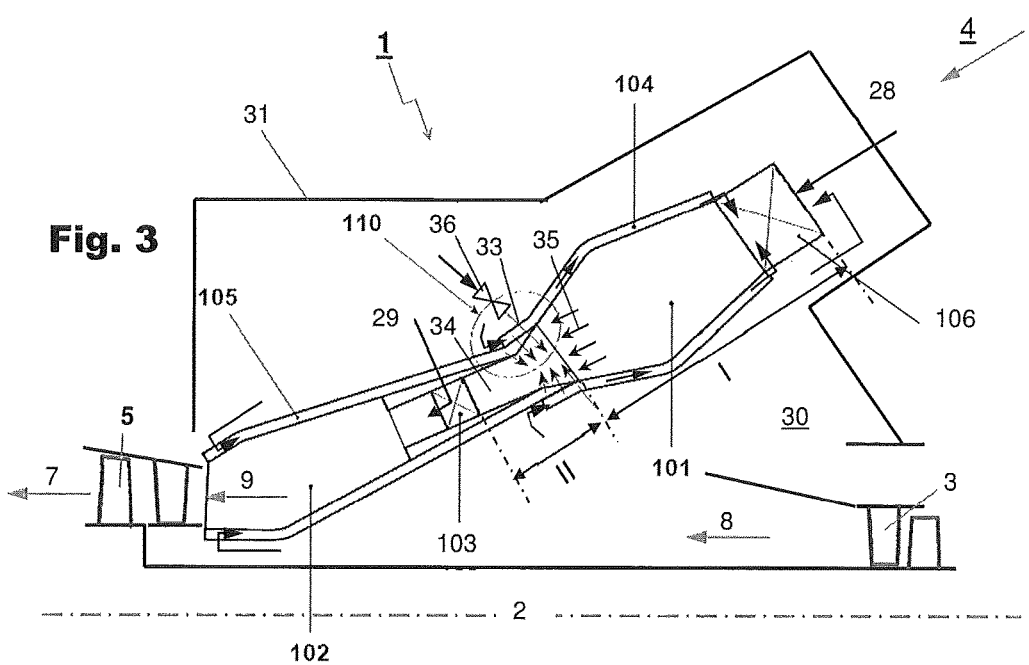
FIG. 3 shows a gas turbine with a sequential combustion arrangement with a first burner, first combustion chamber, an admixer with a dilution gas control valve for controlled admixing of dilution gas, a second burner, and a second combustion chamber.

The embodiment of FIG. 3 is based on FIG. 1. In this example part of the dilution gas 33 is directly taken from the compressor plenum 30 and feed through the dilution gas control valve 36 to the admixer II and injected into the first combustor combustion products. The dilution gas control valve 36 can be used to adjust the ratio of the first momentum flux to the second momentum flux to the design value. The dilution gas control valve 36 can also be used to control the ratio of the first momentum flux to the second momentum flux as a function of an operating parameter of the gas turbine such as for example the relative load or a hot gas temperature of the second combustor 102 or the hot gas temperature of the first combustor 101, or a combination of those.

In FIG. 3 the indicated flow direction of the cooling air flow of the cooling gas for the first liner 104 has been changed. The cooling flow direction in for the second combustor liner 105 could also be reversed. The cooling schemes and technologies are not limited to the ones shown here but different combination of cooling schemes for the first combustor 101 second combustor 102, dilution gas admixer I, and second burner 103 are conceivable.

For all shown arrangements can or annular architectures or any combination of the two is possible. Flame Sheet, EV, AEV or BEV burners can be used for can as well as for annular architectures.

The mixing quality of the admixer II is crucial for a stable clean combustion since the burner system of the second combustion chamber 102 requires a prescribed inlet conditions.

All the explained advantages are not limited to the specified combinations but can also be used in other combinations or alone without departing from the scope of the disclosure.

Other possibilities are optionally conceivable, for example, for deactivating individual burners or groups of burners at part load operation. Further, the cooling gas and the dilution gas can be re-cooled in a cooling gas cooler before use as cooling gas, respectively as dilution gas.

The invention claimed is:

1. A sequential combustor arrangement, comprising:
   a first combustor with a first burner for admitting a first fuel into a combustor inlet gas during operation;
   a first combustion chamber for burning the first fuel;
   a dilution gas admixer for admixing a dilution gas to the first combustor combustion products when leaving the first combustion chamber; and
   a second combustor with a second burner for admixing a second fuel and a second combustion chamber, wherein the first combustor, the dilution gas admixer, the second burner and second combustion chamber are arranged sequentially in a fluid flow connection, wherein a pressure loss coefficient of the first combustor and a pressure loss coefficient of the dilution gas admixer are configured so that during base load operation a ratio of pressure loss of the first combustor to pressure loss of the dilution gas admixer is in a range of 2 to 12 such that operation of the admixer occurs at a constant momentum flux ratio and there is a homogenous temperature profile for an inlet of the second combustor, the constant momentum flux ratio being a ratio between a first momentum flux of a dilution gas flow of the dilution gas fed into the dilution gas admixer and a second momentum flux of a flow of the first combustor combustion products admitted to the dilution gas admixer; and
   wherein a reference cross section for the pressure loss coefficient of the first combustor is a cross section at an exit of the first combustion chamber and a reference cross section for the pressure loss coefficient of the admixer is the cross section at the exit of the first combustion chamber.

2. The sequential combustor arrangement as claimed in claim 1, wherein the ratio of the pressure loss of the first combustor to the pressure loss of the dilution gas admixer is in a range of 3 to 10.

3. The sequential combustor arrangement as claimed in claim 1, wherein the ratio of the pressure loss of the first combustor to the pressure loss of the dilution gas admixer is in a range of 5 to 8.

4. The sequential combustor arrangement as claimed in claim 1, wherein the dilution gas admixer comprises:
   at least one streamlined body which is arranged in the dilution gas admixer for introducing dilution gas into first combustion products leaving the first combustion chamber during operation through at least one nozzle.

5. The sequential combustor arrangement as claimed in claim 1, comprising:
   a feeder for dilution gas which connects a compressor plenum to the dilution gas admixer.

6. The sequential combustor arrangement as claimed in claim 5, comprising:
   a dilution gas control valve is arranged in the feeder for dilution gas.

7. The sequential combustor arrangement as claimed in claim 6, wherein the dilution gas control valve and the feeder for dilution gas are configured to inject dilution gas from a compressor plenum into combustion products emitted by the first combustor that flow through the dilution gas admixer to adjust a ratio of (i) the first momentum flux of dilution gas being injected to (ii) the second momentum flux of the combustion products being admitted into the dilution gas admixer as a function of an operating parameter of a gas turbine.

8. The sequential combustor arrangement as claimed in claim 7, wherein the operating parameter is relative load or a gas temperature of the second combustor or a gas temperature of the first combustor.

9. The sequential combustor arrangement as claimed in claim 7, wherein the dilution gas control valve and the feeder for dilution gas are configured so that the ratio of the first momentum flux to the second momentum flux is maintained as a constant ratio.

10. The sequential combustor arrangement as claimed in claim 1, wherein the first and second combustors are configured in a sequential can-can architecture.

11. The sequential combustor arrangement as claimed in claim 1, first combustor is configured as a can-architecture and the second combustor is configured as an annular combustion chamber.

12. A gas turbine comprising:
a compressor;
a turbine; and
a sequential combustor arrangement according to claim 1 arranged between the compressor and the turbine.

13. The gas turbine of claim 12, wherein the ratio of the pressure loss of the first combustor to the pressure loss of the dilution gas admixer is in a range of 3 to 10.

14. The gas turbine of claim 12, wherein the ratio of the pressure loss of the first combustor to the pressure loss of the dilution gas admixer is in a range of 5 to 8.

15. The gas turbine of claim 12, wherein the sequential combustor arrangement also comprises a feeder for dilution gas which connects a compressor plenum to the dilution gas admixer.

16. The gas turbine of claim 15, wherein the sequential combustor arrangement also comprises a dilution gas control valve arranged in the feeder for dilution gas.

17. The gas turbine of claim 12, wherein the dilution gas admixer comprises:
at least one streamlined body which is arranged in the dilution gas admixer for introducing dilution gas via at least one nozzle into first combustion products leaving the first combustion chamber.

18. The gas turbine of claim 17, wherein the sequential combustor arrangement also comprises:
a feeder for dilution gas which connects a compressor plenum to the dilution gas admixer; and
a dilution gas control valve arranged in the feeder for dilution gas.

* * * * *